Patented Jan. 17, 1939

2,144,271

UNITED STATES PATENT OFFICE 2,144,271

COMPOSITION BOARD AND METHOD OF MAKING THE SAME

Robert G. Quinn, Glens Falls, N. Y., assignor to International Paper Company, New York, N. Y., a corporation of New York No Drawing. Application August 5, 1933, Serial No. 683,908

13 Claims. (Cl. 92—21)

This invention relates to a new and improved process for the manufacture of a fibreboard which is resistant to the attack of insects, termites, fungi and the like. The invention also contemplates the production of a new form of fibreboard.

The usual, commercial fibreboard, being made in whole or in part from fibres of cellulosic origin is readily attacked by certain insects, particularly termites, and it is, under particularly moist conditions, sometimes decomposed by fungi and the like and hence may be subjected to rapid deterioration, rendering it unsatisfactory for use where such destructive agencies exist to any great extent. In the past attempts have been made to produce a fibreboard having insect and fungi repelling characteristics by incorporating in the fibreboard compounds which destroy these agencies. No practical solution of this problem has been found because no known economical method existed which would render the fibreboard produced by them toxic to all commonly encountered insects and fungi.

It is, accordingly, the primary object of this invention to provide a new and improved process of manufacturing fungi and insectproof board, and more particularly to provide a method for introducing into or depositing on the fibres arsenic compounds in a comparatively insoluble form and in sufficient quantity to provide a board which possesses a substantial immunity to the attacks of destructive agencies. Arsenic in its various forms has been more or less widely used as an impregnating material for the protection of woods against the attacks of termites, fungi and the like, but such methods cannot be applied to fibreboard, since they necessitate a redrying of the product after impregnation. Such additional operation is not economical in the manufacture of a low cost product such as insulating board. Furthermore, such treatments are generally unsatisfactory inasmuch as the arsenic compound is readily washed out and tends to migrate to the surface when the product is subjected to varying humidities.

Another object of this invention is to provide an improved process for the manufacture of an insect and fungi proof board which comprises the addition of arsenious oxide in powdered form to the fibrous stock in the mixing, or beating stage. Arsenious oxide is comparatively insoluble in cold water, particularly at pH values less than 7.0 and more than 5.2. The solution pressure of arsenious oxide is low and considerable time is required to dissolve it even under favorable conditions. This phase of my present invention, therefore, is concerned chiefly with the process of maintaining the most adverse conditions to the solution of arsenious oxide by maintaining the pH value in the aforementioned range and forming the fibrous stock into boards with a minimum feasible time interval between the addition of the arsenious oxide and the formation into boards. Hence, by the use of the powder form of arsenious oxide, the formation of soluble arsenic compounds is reduced to a minimum. Such feature of my invention is extremely important as once such soluble compounds are formed it is extremely difficult to precipitate them as desired insoluble arsenites due to the low concentrations employed both of the arsenic itself and the fibre in the beater or mixer.

Another object of my present invention is to provide an improved process for the manufacture of insects and fungi proof board which comprises the addition of zinc sulphate to the stock immediately after the addition of rosin size. Arsenious oxide is added after the rosin size and the zinc sulphate have been intimately mixed in the stock. The addition of zinc sulphate to the stock will result in the pH value changing from an alkaline condition to a mildly acid state, approximately 6.4. The addition of arsenious oxide previous to the zinc sulphate would result in the formation of sodium arsenite due to reaction with the sodium ions in the size. By adding the arsenious acid after zinc sulphate, the formation of sodium arsenite is prevented. As before stated, it is extremely important in the production of a satisfactory fibreboard to prevent the formation of soluble arsenious compounds, as the presence of such compounds renders impractical the precipitation of insoluble compounds throughout the stock.

These and other objects of my present invention will more fully appear as the description of the invention proceeds, it being understood that the following description covers merely a perfected embodiment of the invention. It will be readily apparent to those skilled in the art that many phases of the process may be varied without departing from the essential features of the invention.

After the board making materials have been digested, refined, etc., in accordance with the usual steps employed in the manufacture of paper, board and the like, it is subjected to a mixing operation in a beater or other apparatus. It is during this stage of manufacture that the sizing agent is added.

According to this invention a sizing agent, as for example a rosin size, which is the ordinary paper sizing rosin emulsion usually formed by heating and agitating the rosin with an alkali, is added to the stock in the beater. After the size has been thoroughly mixed with the stock, zinc sulphate is added which serves in part to neutralize the size, precipitating zinc resinate. Sufficient zinc sulphate is added so as to bring the pH of the stock in the beater or mixer to 6.4.

The next step in the process consists in the addition of arsenious oxide to the beater. For example, six (6) pounds of this powder is added to each beater calculated upon the basis of a dry weight of 1700 lbs. of fibres in the agitating device. By adding the arsenious oxide in powder form, after the size has been neutralized, the formation of sodium arsenite is minimized, as once this compound forms it is very difficult to precipitate an insoluble arsenite therefrom due to the very low concentrations of the material in solution in the beater. Hence to obtain a board containing sufficient arsenious oxide it is essential to limit the formation of soluble arsenic compounds. Other insoluble forms of arsenic, such as calcium arsenate may be employed in this process instead of arsenious acid, but I prefer the latter because of its high degree of toxicity to termites. Also, since it is manufactured by a process of sublimation, it is highly pure and the particle sizes are colloidal, consequently a high surface coverage is obtained through its use. Moreover, the advantages in employing arsenious oxide depend to some extent upon the characteristics of this compound. It is not readily wetted by water, especially between a pH value ranging from 5.2 to 6.4. Furthermore, the particles do not coalesce or agglomerate, and when distributed over the surface of water they form a monomolecular layer as does oil.

I find that it is desirable to operate between a pH of 5.2 and 6.4 because of the fact that since the pH of arsenious oxide in solution is 6.6, concentrations below this value tend to keep the arsenious oxide from dissolving. The pH values below 5.2 and above 6.4 result in conditions which are more favorable to the formation respectively, of arsenious addition compounds and of arsenites.

To complete the precipitation and coagulation of the size alum is added. The stock in the beater therefore contains arsenious oxide, zinc resinate and aluminum resinate with possibly some zinc, aluminum and sodium arsenite, and arsenious acid. The latter three compounds, being in solution, represent the major part of the arsenic which is unretained in the formed board.

The chemical and physical reactions which take place in my new and improved process of manufacturing a fungi, insect-proof board cannot be set forth with any degree of exactitude. Apparently the zinc sulphate reacts in the solution to form a resinate of zinc with the rosin emulsion. The action of zinc does not appear to be a mordanting, since poor sizing results are obtained unless alum is also employed with the size.

The powdered arsenious oxide does not dissolve to an appreciable extent and is retained throughout the fibreboard by mechanical methods, primarily by filtration, when water is expelled from the fibre in the formation of board.

The use of zinc sulphate in this process is extremely important in that the presence of its zinc content in the board in the form of zinc resinate and arsenite increases toxicity of the product to fungus growths, termites and the like. It is, for example, particularly effective in destroying fungi of the Fusarium and Penicilium groups. Fibre insulating board is ofttimes used as a base for wallpaper or decorative fabric which is secured to the board by an adhesive. Commonly used adhesives and surface sizings, such as dextrin paste, are effective mediums for the growth of Fusarium and Penicilium organisms. These fungi are characterized by their ability to convert arsenic compounds into gaseous arsines. These compounds, such as diethyl arsine, are extremely poisonous. Arsenic in any form is not lawfully allowed as an ingredient in wall papers because of their possible contamination by these organisms. Board containing arsenious oxide alone, or in combination with compounds, not toxic to these organisms, cannot be safely used in interior decoration. My process, including as it does, the use of zinc in toxic combinations, results in a board which is protected against attack by Fusarium and Penicilium organisms.

I have found that the fibreboard should contain .15% or over of zinc in the form of zinc resinate and .3% of arsenious oxide, to render the said board substantially immune from the attacks of insects, termites, fungi and the like. These substances should be present to render the board toxic to fungus growths of the Penicilium type which have the property of producing gaseous organic arsenic compounds from inorganic derivatives.

As a further advantage in the use of zinc sulphate, I wish to state, that zinc compounds involved are white. Fibreboards are more desirable for interior use when they have high light reflection value. A white board necessitates the consumption of less light colored paint or other finishing material than a dark board for the reason that a thinner film of light colored paints, such as predominate in interior finishing, is required to secure contrast obliteration over a white surface than over a dark one. Consequently, I prefer to take advantage of this inherent characteristic of zinc compounds and produce a light colored board more desired commercially. Manganese or tin sulphate may also be used if desired.

From the above description it will be appreciated that by using arsenious oxide in powdered form many advantages are obtained. As has been previously pointed out, the addition of powdered arsenious oxide to the stock after the zinc sulphate has been added, due to the fact that the addition of the zinc compound causes the formation of a solution having pH value of 6.4, prevents the formation of too great an amount of sodium arsenite. Once this compound is formed, the precipitation of any insoluble arsenite becomes impossible due to the low concentrations employed. Hence to obtain a sufficient quantity of insoluble arsenic compounds in the finished board, the formation of soluble arsenic compounds must be limited. By this process over 80% of the arsenic furnished is retained in the finished board.

What I claim as new is:

1. The method of rendering fibrous materials toxic which comprises adding a rosin emulsion to a water suspension of the fibres, adding zinc sulphate to the suspension to bring the pH thereof to 6.4, thereby precipitating zinc resinate, and then adding arsenious oxide in powdered form to the said suspension.

2. The method of rendering fibrous materials toxic which comprises adding a rosin emulsion to a water suspension of the fibres, adding a zinc compound to the suspension to bring the pH of the suspension to approximately 6.4, adding arsenious oxide in powdered form, and completing the precipitation of the size by the addition of alum.

3. The method of rendering fibrous sheet materials toxic which comprises adding a rosin emulsion, zinc sulphate and dry arsenious oxide in the order named to a wet pulp mixture from which the sheet material is formed.

4. A method of producing a board having fungi and insect repelling characteristics, which comprises adding a rosin emulsion to a water suspension of the fibres, adding a zinc compound to the suspension to lower the pH of the said suspension to at least 6.4, adding a dry arsenious oxide in powdered form and thereafter forming the material into board in the usual manner.

5. The method of producing a board having fungi and insect repelling characteristics which comprises adding a rosin emulsion to a water suspension of the fibres, adding a zinc compound to the suspension in an amount sufficient to provide .15% of combined zinc in the finished board, adding arsenious oxide in powdered form, and thereafter forming the mixture into a board.

6. A method of producing a board having fungi and insect repelling characteristics which comprises adding a rosin emulsion to a suspension of the fibres, adding zinc sulphate in an amount sufficient to provide .15% of combined zinc in the finished board and to bring the pH of the suspension to at least 6.4, adding arsenious oxide in powdered form in an amount sufficient to provide .3% of arsenious oxide in the finished board and thereafter forming the mixture into board form.

7. The method of producing a board having fungi and insect repelling characteristics which comprises adding a rosin emulsion to a suspension of the fibres, adding zinc sulphate in an amount sufficient to provide .15% of combined zinc in the finished board, adding dry arsenious oxide in an amount sufficient to provide .3% of arsenious oxide in the finished board, adding alum in sufficient quantity to complete the precipitation of the size, and thereafter forming the material into board form.

8. A sheet of fibrous material having zinc resinate and arsenious oxide distributed throughout its mass.

9. A sheet of fibrous material having incorporated in and distributed throughout its mass at least .15% of zinc in the form of zinc resinate and .3% of arsenious oxide.

10. A sheet of fibrous material having incorporated in and distributed throughout its mass more than .15% of zinc in the form of zinc resinate and .3% of arsenious oxide.

11. A sheet of fibrous material having incorporated in and distributed throughout its mass at least .15% of chemically combined zinc and .3% of arsenious oxide.

12. The method of rendering fibrous materials toxic, which comprises adding a size to a water suspension of the fibres, adding a salt having a toxic metallic ion to the suspension to bring the pH of the solution to substantially 6.4, adding dry arsenious oxide, and completing the precipitation of the size by the addition of alum.

13. A sheet of fibrous material having incorporated in and distributed throughout its mass at least .15% of a toxic metal in the form of a metallic resinate and .3% of arsenious oxide.

ROBERT G. QUINN.